S. F. CLOUSER.
Amalgamating Machines.
No. 156,410.            Patented Nov. 3, 1874.
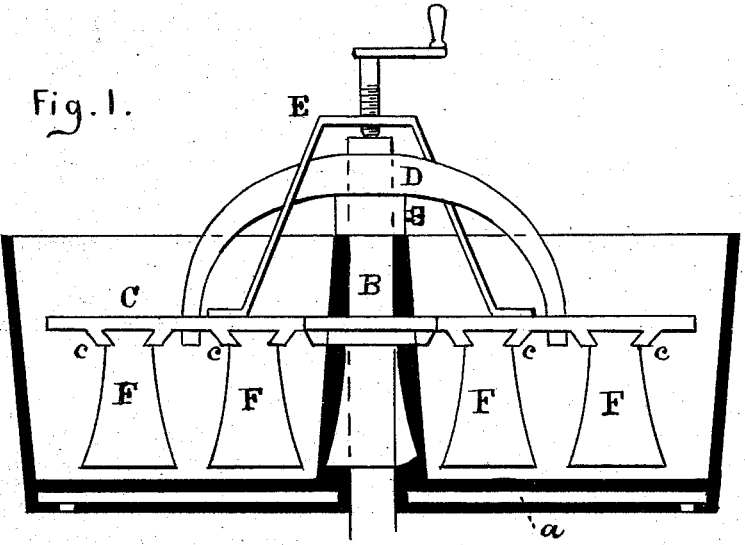
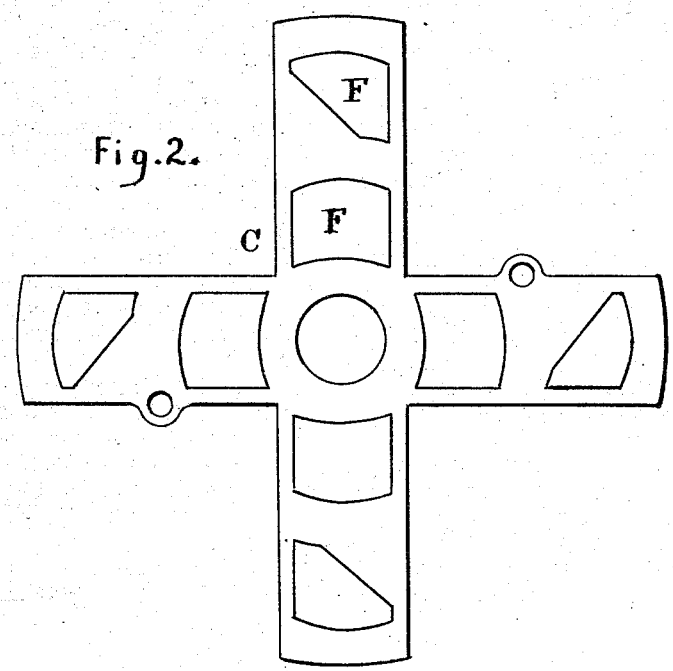
Witnesses:
H. A. Daniels
Carroll Webster
Inventor:
Samuel F. Clouser

UNITED STATES PATENT OFFICE.

SAMUEL F. CLOUSER, OF NEW YORK, N. Y.

IMPROVEMENT IN AMALGAMATING-MACHINES.

Specification forming part of Letters Patent No. 156,410, dated November 3, 1874; application filed October 9, 1874.

*To all whom it may concern:*

Be it known that I, SAMUEL F. CLOUSER, of the city of New York, in the State of New York, have invented certain new and useful Improvements in Machines for Amalgamating Precious Metals; and I hereby declare that the following description, taken in connection with the accompanying drawing, forms a full specification of the same.

My invention consists in providing the muller or grinder, which consists of a crossed iron frame, with shoes of a peculiar form, as hereinafter described, and so attached as to be laterally adjustable.

In the accompanying drawing forming a part of this specification, Figure 1 is a vertical section, showing my improved amalgamator. Fig. 2 is a plan view of the under side of the muller or grinder.

In the drawing referred to, A designates the pan to contain the precious metals, provided with the steam-chamber *a* for heating the pan by steam. B indicates the driving-shaft, to which the muller or grinder C is attached. D designates the driver, keyed to the shaft B. E indicates the bail, supported at the top of the shaft, and provided with the screw *e*, by which the muller or grinder is raised or lowered. F indicates the shoes, which are made in the form shown and are detachable, being attached to the cross-iron by means of flanges *c*, the upper extremities of the shoes being dovetailed for the purpose, as shown in the drawing, thus rendering the shoes laterally adjustable. The said shoes are made of cast-iron, in one piece each, and held in position by the dovetailed grooves formed by the flanges *c*. They are cone-shaped and plowshare-shaped, as shown, so that when the grinder revolves the substance or material is driven in a current toward the center of the pan.

My claim herein is as follows:

1. The muller C, having the dovetailed grooves formed by the flanges *c*, in combination with the cone-shaped and plowshare-shaped shoes F, substantially as herein specified.

2. In an amalgamating-machine heated by steam, as shown, the muller or grinder C, provided with the laterally-detachable shoes F, in combination with shaft B, driver D, bail E, and screw *e*, as and for the purposes described.

SAMUEL F. CLOUSER.

Witnesses:
   H. A. DANIELS,
   JAMES S. GRINNELL.